(12) United States Patent
Posselt et al.

(10) Patent No.: US 12,350,638 B2
(45) Date of Patent: Jul. 8, 2025

(54) REACTOR AND METHOD FOR CARRYING OUT A CHEMICAL REACTION

(71) Applicants: LINDE GMBH, Pullach (DE); BASF SE, Ludwigshafen (DE)

(72) Inventors: Heinz Posselt, Bad Aibling (DE); Martin Hofstatter, Munich (DE); Mathieu Zellhuber, Martinsried (DE); Clara Delhomme-Neudecker, Munich (DE); Eric Jenne, Hassloch (DE); Kiara Aenne Kochendorfer, Mannheim (DE); Andrey Shustov, Ludwigshafen am Rhein (DE); Heinrich Laib, Limburgerhof (DE); Heinz-Jurgen Kuhn, Westhofen (DE); Reiner Jacob, Hochspeyer (DE)

(73) Assignee: LINDE GMBH, Pullach (DE)

( * ) Notice: Subject to any disclaimer, the term of this patent is extended or adjusted under 35 U.S.C. 154(b) by 315 days.

(21) Appl. No.: 18/040,284

(22) PCT Filed: Aug. 5, 2021

(86) PCT No.: PCT/EP2021/071951
§ 371 (c)(1),
(2) Date: Feb. 2, 2023

(87) PCT Pub. No.: WO2022/029270
PCT Pub. Date: Feb. 10, 2022

(65) Prior Publication Data
US 2023/0285929 A1    Sep. 14, 2023

(30) Foreign Application Priority Data

Aug. 7, 2020    (EP) .................................... 20190052

(51) Int. Cl.
*B01J 19/00*    (2006.01)
*B01J 8/06*    (2006.01)
*B01J 19/24*    (2006.01)

(52) U.S. Cl.
CPC ........... *B01J 19/0053* (2013.01); *B01J 8/067* (2013.01); *B01J 19/243* (2013.01); *B01J 2208/00389* (2013.01); *B01J 2219/00135* (2013.01)

(58) Field of Classification Search
CPC .... B01J 19/0053; B01J 19/243; B01J 19/242; B01J 19/2425; B01J 2219/00135; B01J 8/067; B01J 2208/00415
See application file for complete search history.

(56) References Cited

U.S. PATENT DOCUMENTS

| | | | | |
|---|---|---|---|---|
| 1,985,680 | A  * | 12/1934 | Mapes | ...................... C10G 9/42 |
| | | | | 196/121 |
| 9,908,091 | B2 * | 3/2018 | Vogel | ....................... B01J 8/062 |

FOREIGN PATENT DOCUMENTS

| | | |
|---|---|---|
| EP | 3075704 A1 | 10/2016 |
| WO | 2015123578 A1 | 8/2015 |
| WO | 2015197181 A1 | 12/2015 |

OTHER PUBLICATIONS

International Search Report and Written Opinion issued in related App. No. PCT/EP2021/071951, dated Nov. 9, 2021.

* cited by examiner

*Primary Examiner* — Lessanework Seifu
(74) *Attorney, Agent, or Firm* — AVEK IP, LLC

(57) ABSTRACT

A reactor has a reactor vessel and a reaction tube. Tube sections of the reaction tube run inside the reactor vessel. The tube sections are each electrically connectable to a current connection in a current feed region. Current feed arrangements are arranged in the current feed region to which in each case one or one group of the tube sections is electrically connected. Each current feed arrangement has a first and a second section, the first section extending along a longitudinal axis starting from the respective or group of tube section(s). The first section at least partially surrounds the second section or the second section surrounds the first (Continued)

section in a sleeve-like manner. The first and second sections each have contact surfaces arranged obliquely to the longitudinal axis. The current feed arrangements each extend through a wall of the reactor vessel.

20 Claims, 8 Drawing Sheets

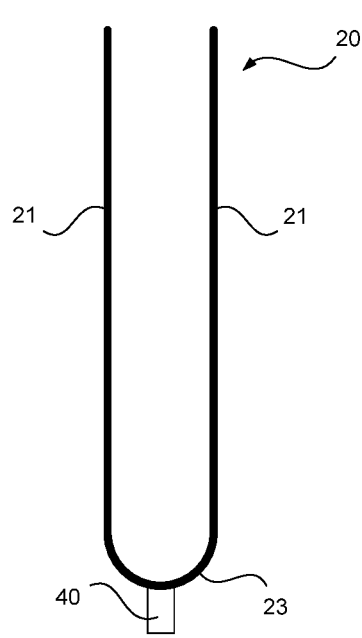
Fig. 7A
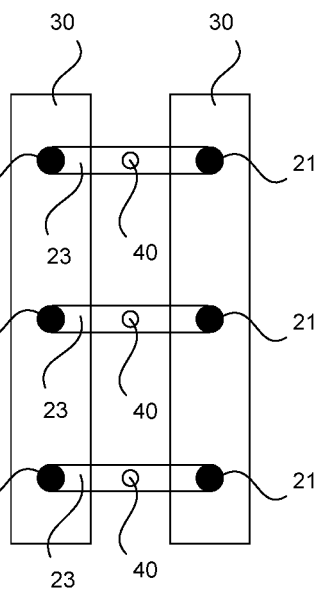
Fig. 7B
Fig. 7C
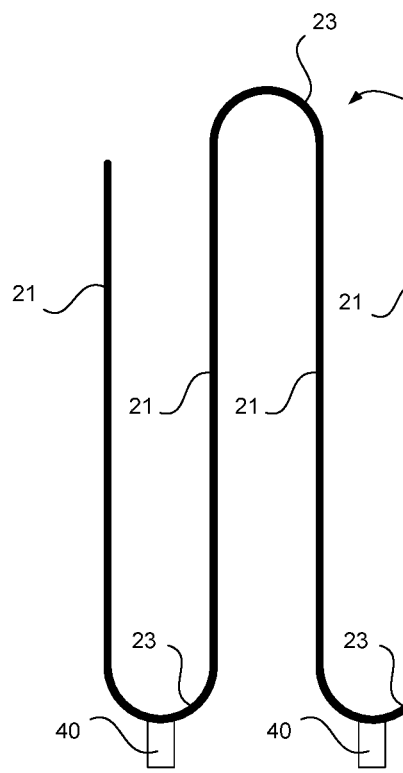
Fig. 8A
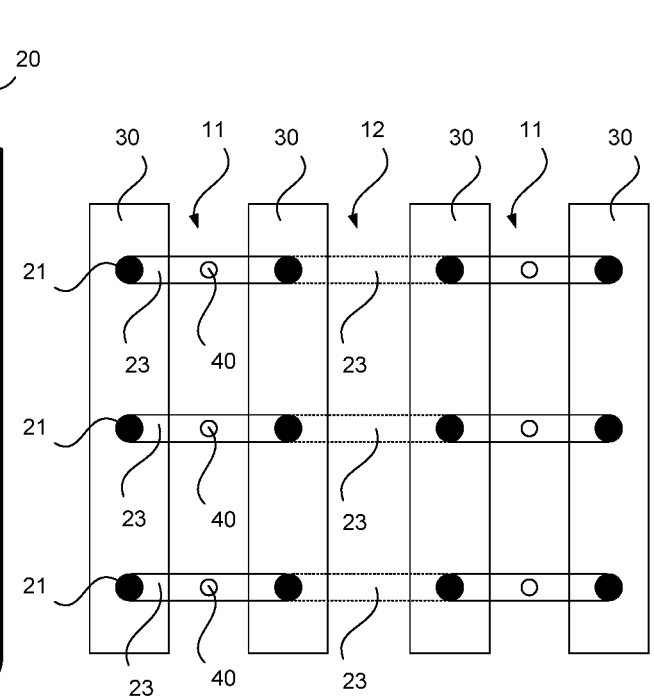
Fig. 8B

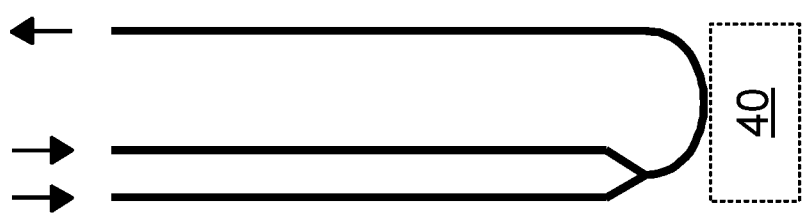
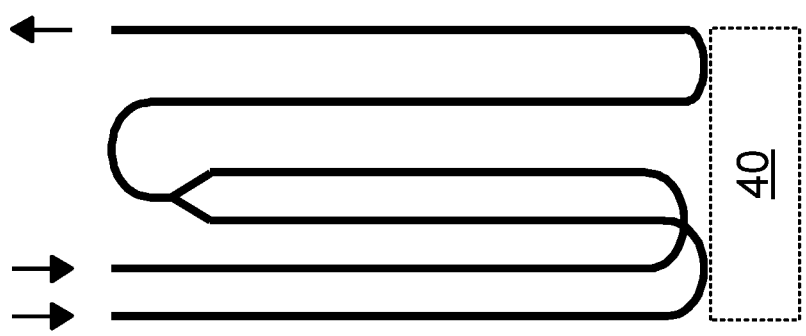
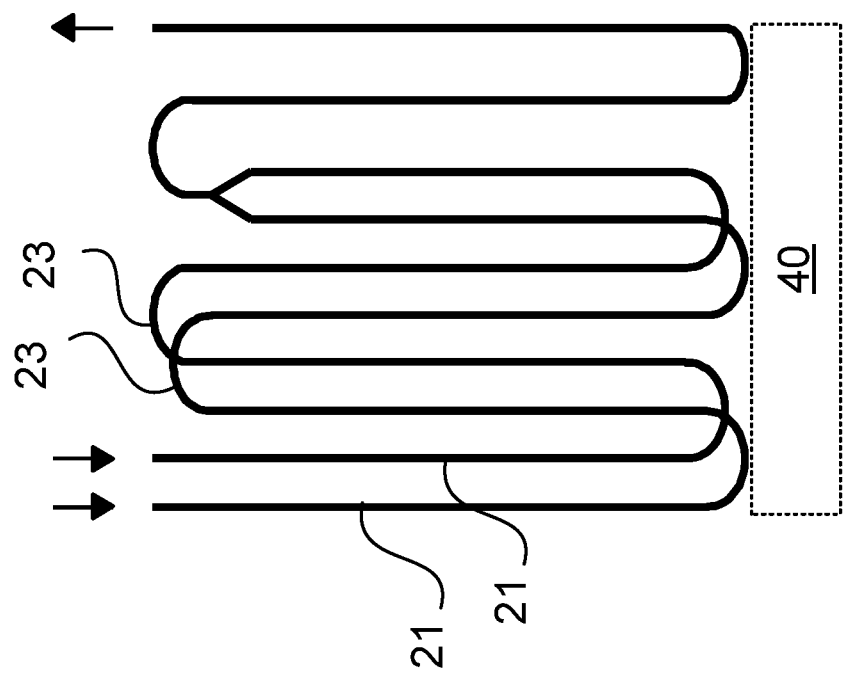

REACTOR AND METHOD FOR CARRYING OUT A CHEMICAL REACTION

CROSS-REFERENCE TO RELATED APPLICATIONS

This application is the national phase of, and claims priority to, International Application No. PCT/EP2021/071951, filed Aug. 5, 2021, which claims priority to European Application No. 20190052.9, filed Aug. 7, 2020.

FIELD OF THE INVENTION

The invention relates to a reactor and a method for carrying out a chemical reaction.

BACKGROUND

In a number of processes in the chemical industry, reactors are used in which one or more reactants are fed through heated reaction tubes and are catalytically or non-catalytically reacted there. The heating serves in particular to overcome the required activation energy for the chemical reaction taking place. The reaction may be endothermic as a whole or, after overcoming the activation energy, exothermic. The invention relates in particular to strongly endothermic reactions.

Examples of such processes are steam cracking, various reforming processes, in particular steam reforming, dry reforming (carbon dioxide reforming), mixed reforming processes, processes for the dehydrogenation of alkanes and the like. In steam cracking, the reaction tubes are guided through the reactor in the form of coils, which have at least one reverse bend in the reactor, whereas in steam reforming, tubes are typically used that run through the reactor without a reverse bend.

The invention is suitable for all such processes and embodiments of reaction tubes. Purely by way of illustration, reference is made here to the articles "Ethylene", "Gas Production" and "Propene" in Ullmann's Encyclopedia of Industrial Chemistry, for example the publications of 15 Apr. 2009, DOI: 10.1002/14356007.a10_045.pub2, of 15 Dec. 2006, DOI: 10.1002/14356007.a12_169.pub2, and of 15 Jun. 2000, DOI: 10.1002/14356007.a22_211.

The reaction tubes of corresponding reactors are conventionally heated by using burners. The reaction tubes are guided through a combustion chamber in which the burners are also arranged.

However, as described for example in DE 10 2015 004 121 A1 (also EP 3 075 704 A1), there is currently an increasing demand for synthesis gas and hydrogen, for example, which are produced without or with reduced local carbon dioxide emissions. However, this demand cannot be met by processes in which fired reactors are used due to the firing of typically fossil energy sources. Other processes are ruled out due to high costs, for example. Same applies to the provision of olefins and/or other hydrocarbons by steam cracking or dehydrogenation of alkanes. In such cases, too, there is a desire for processes that emit lower amounts of carbon dioxide, at least on site.

Against this background, an electrical heating of a reactor for steam reforming in addition to firing is proposed in the aforementioned DE 10 2015 004 121 A1. Here, one or more voltage sources are used that provide or provide a three-phase alternating voltage on three outer conductors. Each outer conductor is connected to a reaction tube. A star connection is formed in which a star point is realised by a collector into which the tubelines open and to which the reaction tubes are conductively connected. In this way, the collector ideally remains potential-free. The collector is arranged below and outside the combustion chamber in relation to the vertical and preferably extends transversely to the reactor tubes or along the horizontal. WO 2015/197181 A1 also discloses a reactor whose reaction tubes are arranged in a star point connection.

In principle, it is also conceivable to electrically heat reactors using direct current or single-phase alternating current. In this case, a star connection with a potential-free star point cannot be realised, but the current feed can basically be realised in a similar way. The invention is suitable for both variants of electrical heating.

In particular, the current feed has proven to be challenging in such electrically heated reactors due to the high current flows and temperatures. The invention therefore sets itself the task of improving corresponding electrically heated reactors for carrying out chemical reactions.

SUMMARY

Against this background, the invention proposes a reactor and a process for carrying out a chemical reaction.

According to an embodiment of the invention, a reactor for carrying out a chemical reaction includes a reactor vessel and one or more reaction tubes. A number of tube sections of the one or more reaction tubes runs inside the reactor vessel, and the tube sections are each electrically connected or connectable to one or more current connections in a current feed region for electrically heating the tube sections. Current feed arrangements are arranged in the current feed region, to which in each case one of the tube sections or in each case one group of the tube sections is electrically connected. The current feed arrangements in each case have a first section and a second section. The first section extends from the respective tube section or the respective group of tube sections or an element connected thereto along a longitudinal axis. The first section at least partially surrounds the second section or the second section at least partially surrounds the first section in a sleeve-like manner in a region of the current feed arrangements in each case. The first section and the second section have contact surfaces arranged obliquely to the longitudinal axis for contacting one another. Finally, the current feed arrangements each extend through a wall of the reactor vessel at a wall passage.

In another embodiment, a method of carrying out a chemical reaction includes using a reactor with a reactor vessel and one or more reaction tubes, wherein a number of tube sections of the one or more reaction tubes extend within the reactor vessel and wherein the tube sections are each electrically connected to one or more current connections in a current feed region for electrically heating the tube sections. Current feed arrangements are arranged in the current feed region of the reactor, to which in each case one of the tube sections or in each case one group of the tube is electrically connected. The current feed arrangements each have a first section and a second section. The first section extends from the respective tube section or the respective group of tube sections or an element connected thereto along a longitudinal axis. The first section at least partially surrounds the second section or the second section surrounds the first section in a sleeve-like manner in a region of the current feed arrangements in each case. The first section and the second section have contact surfaces arranged obliquely to the longitudinal axis for contacting one another. The current feed arrangements each run through a wall of the reactor vessel at a wall passage.

BRIEF DESCRIPTION OF THE DRAWINGS

FIGS. 7A to 7C illustrate tube arrangements for use in a reactor according to an embodiment of the invention.

FIGS. 8A and 8B illustrate tube arrangements for use in a reactor according to an embodiment of the invention.

FIGS. 9A to 9C illustrate further tube arrangements for use in a reactor according to an embodiment of the invention.

DETAILED DESCRIPTION

Figure 1:
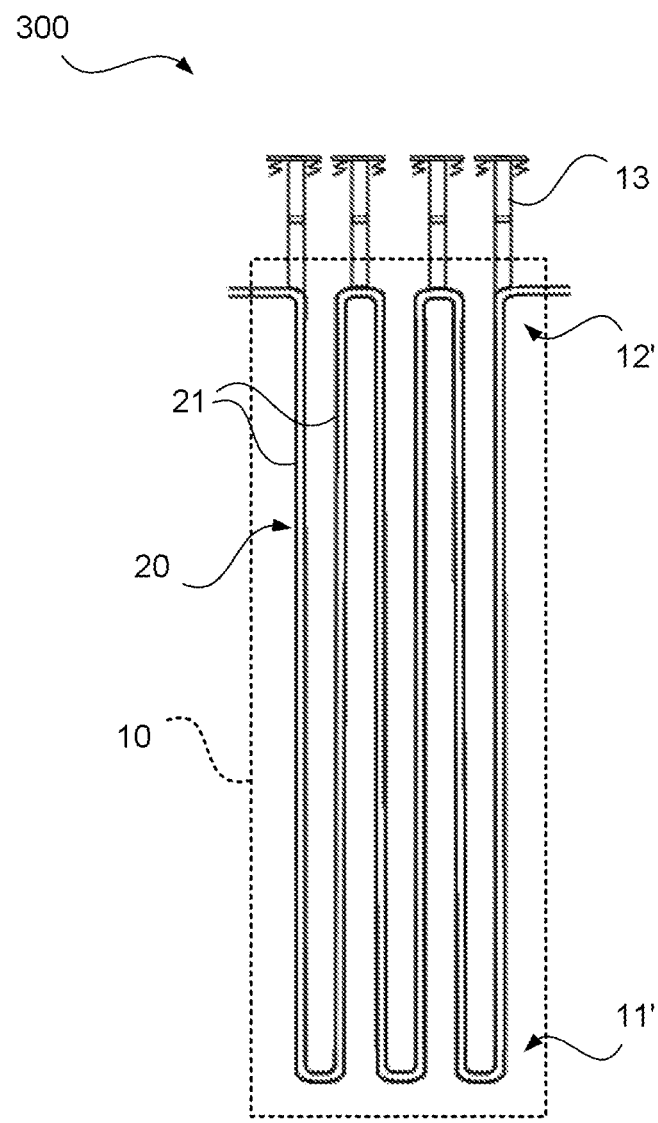
FIG. 1 schematically illustrates a reactor for carrying out a chemical reaction according to an embodiment not according to the invention.

In the mostly partially electrified furnace concept (the term "furnace" is usually used to designate a corresponding reactor or at least its thermally insulated reaction chamber) underlying the invention, at least one of the reaction tubes or corresponding tube sections thereof (hereinafter also referred to as "tubes" for short) is itself used as an electrical resistor to generate heat. This strategy has the advantage of a higher efficiency compared to indirect heating by external electric radiators, as well as a higher achievable heat flux density. Within the scope of the invention, the possibility is included to provide a part of the total heating power applied in the furnace also by firing chemical energy sources.

Therefore, if reference is made to electrical heating herein, this does not exclude the presence of additional non-electrical heating. In particular, it is also possible to vary the contributions of electric and non-electric heating over time, for example depending on the supply and price of electricity or the supply and price of non-electric energy sources such as natural gas.

In the case of heating with multi-phase alternating current, the current is fed into the directly heated reaction tubes via M separately connected phases. The current-carrying reaction tubes, which are connected to the M phases, are advantageously also electrically connected at a star point. The number of phases M is in particular 3, corresponding to the number of phases of usual three-phase current sources or three-phase current networks. In principle, however, the invention is not limited to the use of three phases, but can also be used with a larger number of phases, for example a phase number of 4, 5, 6, 7 or 8. A phase offset in this case is in particular 360°/M, i.e. 120° for a three-phase current.

Due to the star connection at the star point, potential equalisation between the phases is achieved in an electrical heating with multi-phase alternating current, which makes electrical insulation of the connected tubelines superfluous. This represents a particular advantage of such a furnace concept, since an interruption of the metallic reaction tubes for the insulation of certain sections is undesirable, in particular due to the high temperatures used and the high material and construction effort required.

However, the measures described below and proposed in accordance with the invention are equally suitable for the use of direct current and the invention can be used in both alternating current and direct current heated reactors or in corresponding mixed forms. In a direct current arrangement, the only difference from an alternating current arrangement is the type of current source and the area of the reaction tubes or corresponding current-applied sections opposite the current feed. In the latter, an electrical connection of different tube sections is only optionally carried out. Since there is no potential-free neutral point in a direct current arrangement, suitable current extraction elements must be provided to guide the current flow safely back to the outside. The same applies in principle to single-phase alternating current, which can also be used.

In the language of the claims, the invention relates to a reactor for carrying out a chemical reaction (or heating), which reactor comprises a reactor vessel (i.e. a thermally insulated or at least partially insulated region) and one or more reaction tubes, wherein a number of tube sections of the one or more reaction tubes extend within the reactor vessel, and wherein the tube sections are each electrically connected or connectable to one or more current terminals, in the case of a direct current arrangement to one or more direct current terminals and in the case of an alternating current arrangement to the phase terminal(s) ("outer conductors") of the alternating current source, in a current feed region for electrically heating the tube sections, as explained in detail below.

A current feed in the sense understood here takes place by applying a voltage that causes a current flow. The provision of a voltage and the feeding in of a current are therefore synonymous; the same applies to the terms current source and voltage source, current connection and voltage connection as well as comparable terms.

As mentioned, in arrangements operated with polyphase alternating current, alternating voltages are provided via the phase connections, which are phase-shifted in the manner explained above. In such arrangements, supply networks or suitable generators and/or transformers can serve as multiphase AC sources. In such arrangements, star circuits can be formed in a manner known per se, the star points of which are ideally potential-free.

In the case of arrangements operated with direct current, however, the same or different static electrical potentials are fed in via the direct current connections. Since a star point connection is not possible here, current extraction or earthing elements must be provided. Single-phase AC sources can be used in a comparable way. Here, too, neutral point connection is not possible. The terms "feed-in" and "draw-off" can refer to the physical or technical direction of current.

In the reactor vessel, the tube sections run freely, in particular at least in sections, i.e. without mechanical support, without electrical contact and/or without fluidic or purely mechanical cross-connections with each other. In particular, they have essentially completely straight sections, wherein "essentially straight" should be understood to mean that there is an angular deviation of less than 10° or 5°.

In particular, the cracking reactions in steam cracking are strongly endothermic reactions. To provide the necessary energy for the reaction by means of direct heating (ohmic resistance), high currents are therefore required, which in the reactor concept mentioned are provided by one or more transformers placed outside the reactor.

The electric current must be conducted with the lowest possible losses (low electrical resistance) from the outside into the interior of the thermally insulated reactor and to the processing regions. In the latter, the endothermic reaction together with the very fast flowing process medium on the inside of the tube (high heat transfer) leads to a very effective cooling of the reactor tubes, or a very high heat flux density on the inside of the tube. Thus, the desired direct heat transfer from the at least partially electrically heated tube material to the process gas is achieved in the process tubes.

A special problem concerns the above-mentioned low-loss supply of the high-voltage current to the processing tubes. If current is to be fed into the tubes inside the reactor, this supply must necessarily take place via tubes that cannot be cooled by direct convective heat transfer to a cooler process gas, as will also be explained below. This must not lead to an impermissible temperature rise in the less efficiently cooled areas. In addition, a steep temperature rise of up to 900 K (maximum temperature difference between the environment and the reactor) must be overcome within short path lengths (in some cases less than 1 metre) via this supply.

To reduce thermal losses and thus achieve a high system efficiency, it is imperative to place the electrically directly heated reactor tubes in an insulated box (referred to here as a reactor vessel). When penetrating the thermally insulated wall of the reactor container, the current conductor must thereby overcome a quasi-adiabatic zone without unpermittedly high local temperatures occurring in these areas.

According to the invention, in order to achieve this goal, current feed arrangements are provided in the current feed region, to each of which a tube section or a group of tube sections is electrically connected. The tube sections are provided in such a number that in each case one or in each case one group of several tube sections can be connected to in each case one of the current feed arrangements and vice versa. The number of current feed arrangements depends on the number of phase connections of the multi-phase alternating current source in the case of an alternating current arrangement or corresponds to the number of direct current connections. It can be equal to the number of phase connections in the case of an AC arrangement or an integral multiple thereof. In the latter case, for example, two of the current feed arrangements can each be connected to one of the phase connections of the alternating current source, and so on.

According to the invention, the current feed arrangements each comprise a first and a second section, wherein the first section extends along a longitudinal axis starting from the respective tube section or the respective group of tube sections or from an element connected thereto (i.e. the respective tube section or the respective group of tube sections), wherein the first section at least partially surrounds the second section or the second section at least partially surrounds the first section in a sleeve-like manner in a region of the current feed arrangements, and wherein the first section and the second section have contact surfaces aligned obliquely to the longitudinal axis for contacting one another. The longitudinal axis may, but need not, be parallel to a longitudinal axis of the respective tubular sections. The indication "at least partially" is intended to cover cases in which the respective surrounding section has, for example, lateral cutouts which are provided, for example, for receiving protruding cooling fins of the surrounded section.

According to the invention, the current feed arrangements each further extend at a wall passage through a wall of the reactor vessel, wherein in particular the regions of the current feed arrangements in which the first section surrounds the second section or the second section surrounds the first section in each case at least partially in a sleeve-like manner are arranged in the wall passages. The "wall" of the reactor vessel can in particular also be an intermediate wall to a further space in which the current feed arrangements are connected, for example with flexible strands or cables, and which is in turn delimited to the outside by means of at least one further wall. The wall is designed to be thermally insulating in particular.

In the context of the invention, the first sections of the current feed arrangements may be connected to the respective tube sections or the respective groups of tube sections in any manner. For example, they may be welded to, cast onto, or integrally formed with one or more reverse bends or straight tube sections, for example by centrifugal casting. The first sections may also have fluid passages to which the respective tube section or group of tube sections are materially connected, for example welded on. More generally, therefore, in the context of the invention there is a material connection, in particular in the form of a welded connection, between the first sections of the flow feed arrangements and the respective tube sections or the respective groups of tube sections, or the first sections of the flow feed arrangements and the respective tube sections or the respective groups of tube sections are formed integrally.

For example, as described in more detail below, curved tube sections may or may not each extend straight or in the form of a reverse bend through the current feed arrangements. In this way, wall-reinforced bends in particular can be formed through part of the first sections of the current feed arrangements. Reaction tubes without reverse bends may in particular be wall-reinforced sleeves.

Depending on the specific embodiment, the tube sections that run, for example, between the power feed area and an earthing connection or star bridge in the reactor vessel may each be welded to prefabricated components in the form of the first sections of the power feed sections in which one or more fluid passages run, or the first sections may be cast onto the tube sections. In the latter case, continuous tubes may be provided and the first sections of the power feed assemblies may be fabricated by casting on or around or welding on.

It is understood that the first sections of the current feed arrangements do not interrupt a fluid flow in the respective tube sections, so that a continuous channel for the process fluid to be led through the tube sections is always formed. In particular, a tube interior of the respective tube sections also continues in the region of the flow feed arrangements, and in particular without any appreciable tapering or widening, wherein an "appreciable" tapering or widening is intended to denote a tapering or widening by more than 10% of the cross-sectional area.

The term "current feed arrangements" is used herein to express that corresponding arrangements are those arrangements in which there is a conductive connection to a current connection via metallic components, even though in certain embodiments of the invention at least the first sections of the "current feed arrangements" are continuous continuations of the tube sections.

In a particularly preferred embodiment of the invention, the oblique contact surfaces of the first and second sections of the current feed arrangements can be formed as conical inner and outer surfaces. The conical inner surfaces are formed in particular in the respective section at least partially surrounding the other section in a sleeve-like manner, and in particular at the inner end of a recess formed to receive the at least partially sleeve-like surrounded section. The conical outer surfaces are in particular formed in the respective section at least partially surrounded by the other section, and in particular at the end of a rod-shaped region of a corresponding section which is at least partially surrounded in a sleeve-like manner by the respective other section.

Spherical or hemispherical or sectionally spherical or curved contact surfaces are also to be regarded as "oblique" in the sense understood here; furthermore, threads, screw connections, or shapes formed in the form of splined hubs or splined shafts can be provided.

In the following, reference is repeatedly made to "the first section of the power feed-in arrangements" or "the second section of the power feed-in arrangements". This is only for linguistic simplification and can refer to the first or second sections of all power feed-in systems or only to a part thereof.

The conical inner and outer surfaces are arranged in such a way that they can be brought into contact with each other by plugging or pushing the first and second sections of the current feed arrangements together. In this way, an electrical and thermal contact surface can be effectively established between these elements without having to establish a possibly manufacturingly complex or impossible material connection between these elements. In other words, an effective current feed can be made without having to manufacture the entire current feed arrangement from the same material. Rather, the first and second sections can each be specifically adapted to the respective functions required. For example, the material of the first section can be explicitly selected with regard to temperature resistance and sufficient conductivity at corresponding temperatures, and the material of the second section can be designed with regard to good conductivity and connectivity to other materials in a less critical range with regard to the temperatures prevailing there. The advantageous effects of current injection through corresponding current injection arrangements can therefore be achieved with less material technology and manufacturing effort and the structures can be adapted to the required functions.

A particular advantage of using conical contact surfaces, in addition to the advantages already mentioned, is the self-centring of the first and second sections of the current feed arrangements relative to each other, so that, especially when a corresponding pushing-together force is applied, a functionally correct arrangement of the elements and assembly is simplified.

In embodiments of the invention, the conical contact surfaces may be formed as inner and outer surfaces of a conical shell or as inner and outer surfaces of the conical shell of a truncated cone. In all cases, the terminal end of the respective section at least partially surrounded by the other section in a sleeve-like manner can be completely fitted into a corresponding complementary structure of the section at least partially surrounding it in a sleeve-like manner, wherein the use of a conical mantle results in a maximum transmission surface and the use of a truncated cone can result in particular in manufacturing advantages, since the tip of the cone does not have to be completely formed in this case. A tip that may be susceptible to damage is not present in the case of a truncated cone.

In a corresponding embodiment of the invention, the conical contact surfaces can enclose a cone angle of 40 to 120°, in particular, for example, approximately 45° or 60°.

The "cone angle" is to be understood as the angle enclosed by the opposing surface lines of the cone or truncated cone in relation to the axis of symmetry, which define the conical contact surfaces. According to the definition used here, the cone angle corresponds to twice the angle between the axis of symmetry and each generatrix. The smaller the cone angle, i.e. the "more pointed" a corresponding cone or truncated cone is formed, the larger the contact area for the thermal and electrical transition. With smaller cone angles, i.e. when a cone or truncated cone is more "blunt", a more robust design results.

In a particularly preferred embodiment of the invention, an elastically deformable biasing element may be provided which presses the second section of the current feed arrangements along the aforementioned longitudinal axis in the direction of the first section. In particular in connection with the mentioned conical design of the contact surfaces, a permanent and secure contact can be established in this way, since a cone or a truncated cone can thereby be permanently pressed into a corresponding complementary structure. In this way, even a different thermal expansion of the first section and the second section does not lead to a separation of the contact surfaces from each other.

The elastically deformable biasing element can be designed in particular as a (helical) spring. For example, if the first section of the current feed arrangements at least partially surrounds the second section in a sleeve-like manner, a bearing ring or bearing shell can be provided which is screwed onto the first section and which supports a corresponding spring. The spring can act directly on the second section, which is at least partially surrounded by the first section in a sleeve-like manner, or on a corresponding counter structure. In the case of a coil spring, this may in particular be arranged around the second section. Instead of helical springs, for example, corrugated rings or the like may also be provided. The invention is not limited by the specific embodiment.

In an alternative to a conical design of the contact surfaces, these may also be designed as surfaces of threads. In other words, in this embodiment of the invention, it can be provided that the first section of the current feed arrangements is screwed into the second section or vice versa. By screwing in accordingly, an expansion of the respective screwed-in element can be effected, which can ensure a further fixed arrangement of the elements, and thus of the contact surfaces to each other, even in the case of different thermal expansions.

In a particularly preferred embodiment of the invention, the second section of the current feed arrangements in particular may be provided with and/or connected to surface-enlarging elements. These may, for example, be in the form of cooling fins. In this way, a targeted heat dissipation from the second sections can take place.

If a one-piece construction of the first sections of the current feed arrangements and the tube sections is not provided from the outset, in corresponding embodiments of the invention the said components are connected in a materially fixed manner at high temperatures. The term "high-temperature-resistant materially bonded" is intended to designate a type of connection by means of which two or more metallic parts are materially bonded to one another and the connection is permanent at 500° C. to 1,500° C., in particular 600° C. to 1,200° C. or 800° C. to 1,000° C., i.e. does not become detached at such temperatures during regular operation. A high-temperature-resistant material-locking connection can be designed in particular as a metal-to-metal connection, which is executed in such a way that no nonmetallic material remains between the connected parts. Such a connection can be made in particular by welding, casting on or casting around. It can also be a joint in which no structural difference is found at the transition of the joined parts and in particular a joint in which no additional metal is used for the joint.

The first sections and the second sections of the current feed arrangements are, for example in contrast to strands or the like, in particular formed in one piece and rigidly (i.e. in particular not in the form of parallel or interwoven wires). In particular, they are solid structures, but it is understood that the section surrounding the other section at least partially in a sleeve-like manner is formed in particular as a hollow bar or tubular.

The first and the second section have in particular a longitudinal extension along the mentioned longitudinal axis and perpendicular to the wall of the reactor vessel which is at least twice as large, in particular at least three, four or five times and for example up to ten times as large as a largest transverse extension parallel to the wall of the reactor vessel. The section at least partially surrounded by the other section can be round, oval or triangular or polygonal in cross-section, for example, or have any other shape. The section of the current feed arrangements at least partially surrounding the other section in each case has an inner shape which corresponds to a negative shape of the section at least partially surrounded by it.

According to the invention, the current is introduced into the reaction tubes or their sections to be heated via the current feed arrangements, which are attached to the process-leading reaction tube, for example, in a direction perpendicular to the local process gas flow and extend in this direction along the aforementioned longitudinal axis, i.e. in particular at the apex of a reverse bend or perpendicular to the course of the tube in the case of non-curved reaction tubes. In the latter case, the mentioned longitudinal axis can also be parallel to the course of the tube.

In particular, a globally decreasing free specific conductor cross-section a, which is formed by the first and the second section, can be present from the outside towards the reaction zone. This applies both to the area in which the first section at least partially surrounds the second section or the second section at least partially surrounds the first section, as well as to a transition area to the reaction tube, in which an increased wall thickness is preferably provided in comparison to the reaction tube far from the feed.

The free specific conductor cross-section a (unit: m/Ω) is defined as follows for any cross-sectional area S having an area A1 (unit: square metre) in a first section with an average specific electrical resistance ρ1 (unit: Ω×m) and an area A2 in a second section with an average specific electrical resistance ρ2:

$$a = A1/\rho1 + A2/\rho2$$

A particularly advantageous embodiment of the invention comprises that for any two cross-sectional areas S1, S2 through the current feed arrangements representing isosurfaces (wherein such cross-sectional areas may run through the first section alone, the second section alone, or through the region, in which the first section at least partially surrounds the second section or the second section at least partially surrounds the first section), over which the time-square-averaged value (rms value) of the electrical potential $V_{rms,i}$ is constant in each case, and which are arranged at different distances from the AC voltage source, i.e. in particular a transformer, the time-square-averaged potential $V_{rms,1}$ of the cross-sectional area S1 closer to the transformer is always higher than the time-square-averaged potential $V_{rms,2}$ of the cross-sectional area S2 further away from the transformer, so that $V_{rms,1} > V_{rms,2}$ applies. The terms "closer" and "further" refer to shorter and longer flow distances of the electric current from the current source to the respective cross-sectional area. The use of rms values for the potentials refers to reactor operation with alternating current. In the case of direct current operation, the described relationships apply to arithmetically averaged values of the electric potential.

The entire current feed (i.e. the current feed arrangements as a whole) is further advantageously designed in such a way that for the explained two arbitrary cross-sectional areas S1 and S2 at different distances from the current source and with $V_{rms,1} > V_{rms,2}$ the quotient a2/a1 of the free specific conductor cross-section a2 of the cross-sectional area S2 lying further away from the current source and of the free specific conductor cross-section a1 of the cross-sectional area S1 lying closer to the current source is up to 0.5, in particular up to 0.9, up to 1, up to 1.1 or up to 2. In a particularly preferred embodiment, the quotient a2/a1 of the free specific conductor cross-sections of any such surface pairs is up to 1.

For manufacturing reasons, for example, deviations from this preferred design may occur, so that even small increases in cross-section can be accepted locally. However, for two cross-sectional areas S1* and S2* with global extreme values of their respective free specific conductor cross-sections a1*=amax and a2*=amin, the relationship $V_{rms,1*} > V_{rms,2*}$ advantageously always applies, i.e. the area with the highest free specific conductor cross-section is closer to the current source than the area with the smallest free specific conductor cross-section.

In this way, an optimally continuous increase of the material temperature can be ensured, wherein the maximum is preferably only reached in the reaction zone. As a default with regard to the temperature distribution, it can be determined analogously to the free specific conductor cross-sectional distributions according to a particularly advantageous embodiment of the invention, that for the explained two arbitrary cross-sectional areas S1 and S2 at different distances from the current source and with $V_{rms,1} > V_{rms,2}$ the temperature difference T1−T2 of the temperature T1 of the cross-sectional surface S1 lying closer to the current source and the temperature T2 of the cross-sectional surface S2 lying further away from the current source is up to −100 K, in particular up to −10 K, up to −1 K, up to 0 K, up to 1 K, up to 10 K or up to 100 K. In a particularly preferred embodiment, the temperature difference T1−T2 of all such pairs of surfaces is less than 0 K.

This specification includes, among other things, the condition that a maximum local temperature rise of −100 K, −10 K, −1 K, 0 K, 1 K, 10 K or 100 K compared to the maximum occurring material temperature in the adjacent tube section occurs in the entire area of the current feed.

The temperature difference T1*−T2* of the temperatures T1* and T2* of the cross-sectional areas S1* and S2* with the global extreme values of the free specific conductor cross-sections a1*=amax and a2*=amin in the current feed arrangements is furthermore advantageously up to −500 K, up to −200 K, up to −100 K, up to 0 K or up to 100 K, i.e. that the surface with the highest cross-section according to this embodiment of the invention is closer to the transformer and is preferably cooler or at most slightly hotter than the surface with the smallest cross-section.

In an embodiment of the invention, the free specific conductor cross-section in the current feed arrangements decreases advantageously from the direction of the current feed towards the reaction tubes in a predominantly continuous or monotonous manner. Since, with the combination of materials provided in this embodiment, the length-specific electrical resistance depends only on the available free specific conductor area, the specific amount of energy released also increases steadily in this way. In this way, the highest possible utilisation of the supplied energy is achieved, since only the amount of heat absorbed by the process gas can be effectively utilised in the reaction tubes.

According to a particularly advantageous embodiment of the invention, the exact course of the free specific conductor cross-section of the current feed arrangements is furthermore adapted to the local temperature and heat transfer conditions. For example, in the region of quasi-adiabatic wall penetrations through the wall of the reactor vessel (in which no significant heat dissipation is possible through the insulating reactor wall), large free specific conductor cross-sections are preferably used, which reduce the local heat dissipation in these regions to a minimum, so that the local temperature rise can be limited upwards. In other words, the current feed arrangements advantageously have a larger free specific conductor cross-section in the area of the wall penetration than in at least one other area.

As explained below, in order to avoid contact resistance, at least the first section of the current feed section and an area contacting the tube sections are preferably made of a one-piece component, e.g. in the form of a stationary casting. In the case of a multi-part design, which is also possible as an alternative, suitable joining methods (e.g. friction welding) are advantageously used to ensure that the specifications explained with regard to the free specific conductor cross-section and the maximum local temperature increase are also complied with in the area of the joint.

With particular advantage, the current feed arrangements each have a free specific conductor cross-section which, between the respective wall passage of the current feed sections and a region in which the tube sections are electrically contacted, is at no point less than 500 m/$\Omega$, advantageously at no point less than 1500 m/$\Omega$ and in particular at no point less than 2500 m/$\Omega$. By using correspondingly high free specific conductor cross-sections, a particularly good current transfer without resistance losses can be ensured.

Alternatively to the design of the free specific conductor area as just explained—or at least partially synonymous therewith—a corresponding design based on the length-specific electrical resistance can also be provided within the scope of the invention, wherein this increases steadily, in particular continuously, coming from the transformer towards the reaction zone. The length-specific electrical resistance R/L (unit: $\Omega$/m) is determined from the electrical resistance R, the unit length L, the specific electrical resistance $\rho$ and the free conductor cross-sectional area A with $R = L \times \rho/A$, so that $R/L = \rho/A$.

This approach covers both a changing geometry (e.g. a variable diameter of the current feed arrays) and a combination with another material (with a different electrical resistivity, if applicable).

Advantageously, the current feed arrangements are each guided longitudinally movable in their wall passages through the wall of the reactor vessel. Freedom of movement ensured in this way is particularly advantageous for the mechanical behaviour of the reaction tubes, which is dominated above all by the thermal expansion of the tubes by several decimetres during operation of the reactor. The freedom of movement will reduce the bending load on the reaction tubes that would occur with a rigid mounting. On the other hand, the reaction tubes can be provided with a rigid star bridge, as will also be addressed below, so that in this way a stable suspension is provided even with a corresponding longitudinal mobility of the current feed arrangements. Due to their advantageous dimensioning with a sufficiently high total cross-section, the current feed arrangements ensure safe lateral guidance of the reaction tubes.

Since the reactions carried out in the reactor according to the invention require high temperatures, the electrical connection in the power feed area must be realised in a high temperature range of, for example, approx. 900° C. for steam cracking. This is possible by the measures proposed in accordance with the invention by selecting suitable materials and dimensioning them sufficiently. The connection should simultaneously have a high electrical conductivity and a high mechanical stability and reliability at high temperatures. Failure of the electrical connection leads to asymmetrical potentials at the star point and, as a consequence, to immediate safety-related shutdown of the plant due to undesired current conduction of plant components. By avoiding such situations, the invention leads to advantages over the prior art.

The contacting of the tube sections provided for in the invention inside the reactor vessel compared to a theoretically also possible contacting outside the reactor vessel, for which the reaction tubes would have to be led out of the reactor vessel, has the advantage of a more clearly defined path of the electrical heat input, because here no electrically heated tube sections have to be led from the warmer interior space to the colder exterior space. Due to the contacting according to the invention, spatially very homogeneous external thermal boundary conditions of the electrically heated tube sections can be achieved because the tube sections are arranged completely inside the reactor vessel. This results in process-technical advantages, for example, an excessive local coke formation to be expected in heated and outwardly thermally insulated passages can be avoided.

Outside the reactor vessel or in a connection chamber, in particular a cooled connection chamber, which is arranged outside the actual reactor vessel, the current feed arrangements can be electrically connected to a transformer system, for example, by means of connection elements such as busbars and connection strips. The connection strips and busbars can be made of a different material than the first or second sections of the current feed arrangements. These connecting elements can be designed to be flexible in particular, since lower temperatures are present outside the reactor vessel. Switching devices can be installed in particular on a primary side of the transformer system because a higher voltage and a lower current are present there.

In the context of the invention, first sections of the current feed arrangements and the tube sections may be formed of the same material or of materials whose electrical conductivities (in the sense of a material constant, as is customary in the art) differ from one another by no more than 50%, no more than 30%, no more than 10% or are advantageously the same. For example, said components may also be formed from steels of the same steel class. The use of the same or closely related materials can facilitate casting or welding.

On the other hand, by using the invention, other materials can be chosen for the second sections, which, for example, ensure easier machinability, and which, for example, can be connected in a simpler manner to expansion elements for current injection. The decisive criterion for the selection of the material for the second section is a low specific electrical resistance, with as high a temperature compatibility as possible. Generally, a material consisting of a single metal from the group of molybdenum (Mo), tungsten (Wo), tantalum (Ta), niobium (Nb), nickel (Ni) and chromium (Cr) or a metal alloy can be used, which contains at least 50% by mass of at least one material from the group of Mo, Wo, Ta, Nb and Cr. Components such as zirconium (Zr), carbon (C) in the form of carbides and/or rare earths such as hafnium (Hf), lanthanum (La) may also be included.

An overview of commercially available materials of corresponding composition for possible use in the second section can be obtained from corresponding manufacturers. The following is a selection of materials without any claim to completeness.

Molybdenum-based materials may include, for example, pure or substantially pure molybdenum or known alloys with material designations TZM, MHC, ML, MLR, MLS, MoILQ, MY, MoRe5, MoRe41, MW20, MW30, MW50, MoCu30, MoCu15, MZ17, MoNb10 or MT11. Tungsten-based materials include, for example, pure or substantially pure tungsten and known alloys with material designations WK65, WVM, WVMW, S-WVMW, WC, WL, WL-S, WLZ, WRe, WCu and high-density tungsten heavy metal alloys. For example, pure or substantially pure tantalum in sintered or cast quality, in particular known materials such as TaS, TaK, TaKS, Ta2.5W or Ta10W can be used as tantalum materials. In addition to pure or essentially pure chromium, the alloy CFY, for example, can also be used.

In a preferred embodiment, the first sections of the current feed arrangements and the tube sections each have or are formed from a heat-resistant chromium-nickel steel alloy with high oxidation or scale resistance and high carburisation resistance.

For example, it may be a ferrous material containing 0.1 to 0.5 wt % carbon, 20 to 50 wt % chromium, 20 to 80 wt % nickel, 0 to 2 wt % niobium, 0 to 3 wt % silicon, 0 to 5% tungsten and 0 to 1 wt % other components, the contents adding up to the non-ferrous content in each case.

For example, materials with the standard designations GX40CrNiSi25-20, GX40NiCrSiNb35-25, GX45NiCrSiNbTi35-25, GX35CrNiSiNb24-24, GX45NiCrSi35-25, GX43NiCrWSi35-25-4, GX10NiCrNb32-20, GX50CrNiSi30-30, G-NiCr28W, G-NiCrCoW, GX45NiCrSiNb45-35, GX13NiCrNb45-35, GX13NiCrNb37-25, or GX55NiCrWZr33-30-04 according to DIN EN 10027, part 1, "Materials", can be used. These have proven to be particularly suitable for high-temperature use.

In all cases explained above, the first sections of the current feed arrangements and the tube sections may be formed of the same material or of materials whose electrical conductivities (in the sense of a material constant, as is customary in the art) differ from one another by no more than 50%, no more than 30%, no more than 10% or are advantageously the same. For example, the connecting element and the tube sections may also be formed from steels of the same steel class. The use of the same or closely related materials can facilitate the integral formation of the first sections and the tube sections, for example by casting or welding.

As mentioned, all tube sections within the reactor vessel can be electrically conductively connected to each other by means of a rigid connecting element ("star bridge") when heated by means of multi-phase alternating current, or this connection can be made in groups by means of several rigid connecting elements.

Through a corresponding realisation of a star circuit in combination with the explained current feed via longitudinally guided current feed arrangements, a construction is created overall that enables an efficient current feed with simultaneous stable fastening that withstands the stresses resulting above all from the high thermal expansion rates.

This also applies to the heating by means of direct current or single-phase alternating current, which is also possible according to the invention, wherein in this case, as mentioned, there is no star point in the reactor. Nevertheless, a rigid arrangement can also be provided here at the end opposite the current feed, since the reaction tubes can expand essentially freely without the generation of voltages due to the current feed arrangements provided according to the invention. A rigid arrangement can therefore be provided at the end of the reaction tubes opposite the current feed, but elements corresponding to the current feed arrangements according to the invention can also be provided here if necessary. In any case, however, a movable arrangement can be dispensed with.

The invention is first described below with reference to reaction tubes and reactors as used for steam cracking. However, as explained thereafter, the invention can also be used in other types of reactors as addressed thereafter. In general, as mentioned, the reactor proposed according to the invention can be used to carry out all endothermic chemical reactions.

Reaction tubes, as typically used for steam cracking, typically have at least one reverse bend. A reactor used according to the invention can thus be designed in particular as a reactor for steam cracking, in particular by the choice of corresponding temperature-resistant materials and the geometric design of the reaction tubes.

For example, the reaction tubes used in this context can be so-called 2-passage coils. These have two tube sections in the reactor vessel that merge into one another via (exactly) one reverse bend and therefore basically have the shape of an (extended) U. In such arrangements, the sections entering and leaving the reactor vessel merge into the heated tube sections, in particular seamlessly or without any transition relevant to the flow.

In this embodiment, the reactor can thus be designed in such a way that the tube sections each comprise two tube sections of a plurality of reaction tubes which are arranged at least partially next to one another in the reactor vessel, the two tube sections of the plurality of reaction tubes in each case merging into one another in the current feed region via a respective reverse bend.

In this case, the current feed arrangements can be connected to the reverse bends. Since there are several reaction tubes with reverse bends, several reverse bends can be provided in the respective current supply arrangements if there are a sufficient number of them and can be connected to a current connection in this way. In this way, the mechanical fastening can be improved and the number of components reduced. Alternatively, it is also possible to provide one current feed arrangement per reverse bend, even if several reverse bends are supplied with current via one current connection, for example in order to ensure individual longitudinal mobility of the current feed arrangements in the case of possibly different thermal expansion of the tube sections.

The design of the invention just explained can also be transferred to cases in which branched reaction tubes are used, i.e. in which fluid fed in from one tube section is distributed to two or more tube sections, or in which fluid from two or more tube sections is combined in one tube section. In this case, too, two tube sections of several reaction tubes, which are at least partially arranged next to each other in the reactor vessel, can be supplied with current in the explained manner via a current feed arrangement according to the invention.

In addition to the design described above with reference to 2-passage coils, however, a design can also be used that is suitable for use with so-called 4-passage coils. These have four essentially straight tube sections. However, arrangements with a higher, even number of straight tube sections are also possible. However, two tube sections of several reaction tubes, which are at least partially arranged next to each other in the reactor vessel, are also supplied with current in the explained manner via a current feed arrangement according to the invention.

A "reverse bend" is understood here to mean in particular a tube section or tube component which comprises a part-circular or part-elliptical, in particular semicircular or semi-elliptical tube bend. The beginning and end have cut surfaces that are adjacent to each other in a plane.

Each of the reverse bends, provided that it is located in the current feed region within the reactor vessel and is to be appropriately energised, may be in the form of, or form part of, a passage in the first section of a current feed arrangement according to the invention.

Reaction tubes, such as those typically used for steam reforming, typically do not have reverse bends within the reactor vessel. In this case, however, the tube sections each comprise a tube section of several reaction tubes, wherein the tube sections are fluidically unconnected within the reactor vessel and at least partially arranged next to each other. The reaction tubes can in particular also be equipped with a suitable catalyst for steam reforming.

In this embodiment, the contact passages in a current feed arrangement according to the invention are straight tube sections or channels. The current feed assemblies may have a region that is cuffed to or integral with the reaction tubes.

In all cases, the number of metal-to-metal connections (e.g. welded or soldered connections) can be reduced or even completely dispensed with by forming the current feed arrangements and optionally also the tube sections from as few individual parts as possible. This can increase the mechanical stability as well as the reliability. In a particularly advantageous embodiment, the current feed arrangements and the tube sections can each be implemented as a single casting, or, as mentioned, parts of the process-leading tubelines can be recast and/or parts of the process-leading tubelines can be formed as an integral part of a corresponding casting.

Metal-to-metal connections or metal junctions, which can be reduced within the scope of the invention, could lead to a local change in electrical resistance and therefore to hot spots. Hot spots in turn lead to a reduction in lifetime due to increased local temperatures or to mechanical stress peaks due to high local temperature gradients. This is avoided in the invention.

A one-piece design of as many components as possible brings mechanical stability, reliability and a reduction of individual components. A high degree of mechanical stability is desirable, since failure, as mentioned, can lead to safety-critical situations. By the described design in the sense of the invention, the principle of reaction tubes resistance-heated with multiphase alternating current can be technically realised in the high-temperature range, i.e. in particular at more than 500° C., more than 600° C., more than 700° C. or more than 800° C.

The invention is further explained below with reference to the accompanying drawings, which illustrate embodiments of the invention with reference to and in comparison with the prior art.

In the figures, structurally or functionally corresponding elements are illustrated with identical reference signs and are not explained repeatedly for the sake of clarity. If components of devices are explained below, the corresponding explanations also refer to the processes carried out with them and vice versa. The figure description repeatedly refers to alternating current heating. However, as mentioned, the invention is equally suitable for the use of direct current for heating. Reference is made to the above explanations.

FIG. 1 schematically illustrates a reactor for carrying out a chemical reaction according to an embodiment not according to the invention.

Figure 2:
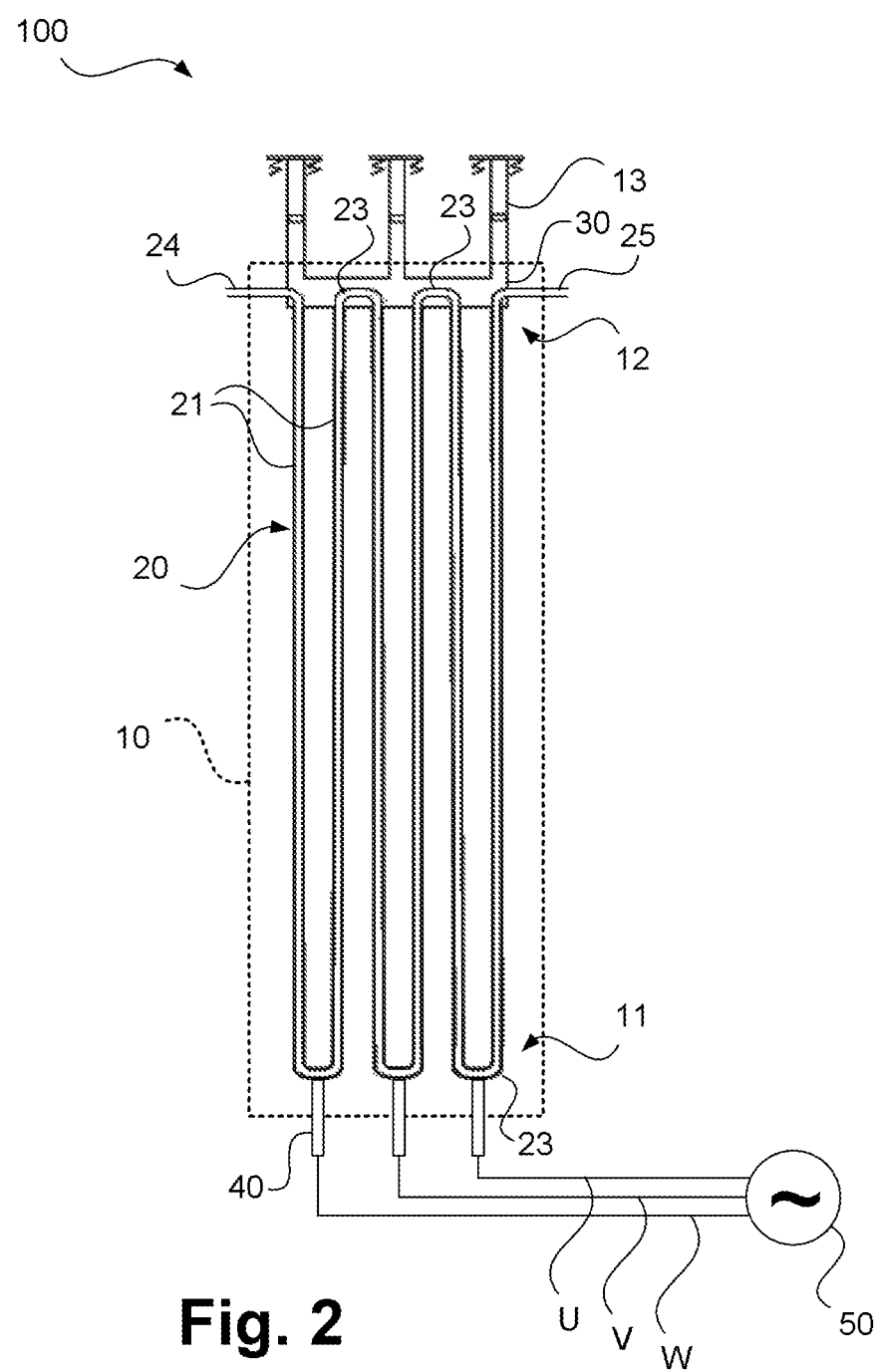
FIG. 2 schematically illustrates a reactor for carrying out a chemical reaction according to an embodiment of the invention.

The reactor designated here as 300 is set up for carrying out a chemical reaction. For this purpose, it has a reactor vessel 10, in particular a thermally insulated reactor vessel, and a reaction tube 20, wherein a number of tube sections of the reaction tube 20, which are designated here with 21 in only two cases, each run between a first zone 11' and a second zone 12' in the reactor vessel 10. The reaction tube 20, which will be explained in more detail below with reference to FIG. 2, is attached to a ceiling of the reactor vessel or to a support structure by means of suitable suspensions 13. In a lower region, the reactor vessel may in particular have a furnace which is not illustrated. It is understood that several reaction tubes can be provided here and below.

FIG. 2 schematically illustrates a reactor for carrying out a chemical reaction according to the embodiment of the invention, which is designated 100.

The zones previously designated 11' and 12' are shown here as areas 11 and 12, wherein the tube sections 21 for heating the tube sections 21 in the current feed regions 11 are each electrically connectable to the phase connections U, V, W of a multi-phase alternating current source 50. Switches and the like as well as the specific type of connection are not illustrated.

In the embodiment of the invention illustrated here, the tube sections 21 are electrically conductively connected to one another in the regions 12 by means of a connecting element 30 which is integrally connected to the one or more reaction tubes 20 and is arranged inside the reactor vessel 10. A neutral conductor may also be connected thereto.

In the reactor 100 illustrated here, several tube sections 21 of a reaction tube 20 (although several such reaction tubes 20 may be provided) are thus arranged side by side in the reactor vessel 10. Two tube sections 21 each merge into one another via reverse bends 23 (only partially designated) and are connected to a feed section 24 and a withdrawal section 25 for a working fluid.

A first group of reverse bends 23 (in the drawing, below) is arranged side by side in the region 11 and a second group of reverse bends 23 (in the drawing, above) is arranged side by side in the region 12. The reverse bends 23 of the second group are formed in the connecting element 30 and the tube sections 21 extend from the connecting element 30 in the area 12 to the area 11. This specific arrangement is not mandatory.

The use of the connecting element 30 is optional within the scope of the invention, although advantageous. On the other hand, embodiments of the invention which are explained below relate in particular to the design of the means for feeding current into the area 11 which is therefore referred to as the current feed region. This is achieved by using current feed arrangements 40, which are illustrated here in a highly simplified manner and of which only one is designated.

Figure 3:
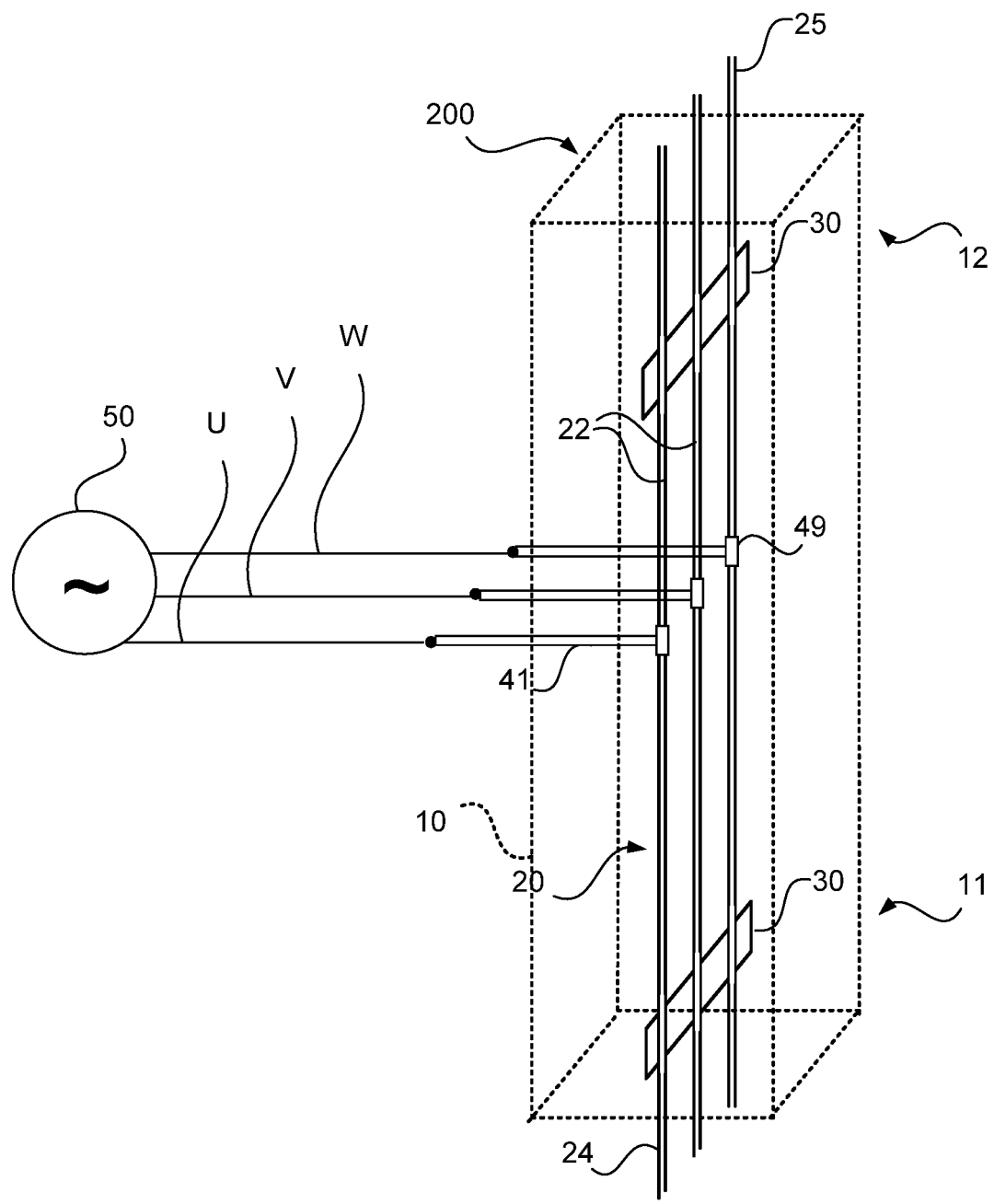
FIG. 3 schematically illustrates a reactor for carrying out a chemical reaction according to a further embodiment of the invention.

FIG. 3 schematically illustrates a reactor for carrying out a chemical reaction according to the embodiment of the invention, which is designated 200.

In the reactor 200, the tube sections designated differently here as 22 each comprise a tube section 22 of a plurality of reaction tubes 20, the tube sections being arranged fluidically 22 unconnected next to one another in the reactor vessel 10 and each being connected to feed sections 24 and withdrawal sections 25 for working fluid. With regard to the other elements, reference is expressly made to the above explanations of the preceding figures.

Again, the use of a connector 30 is optional, although advantageous, in the context of the invention. Again, current feed arrangements 40 are illustrated in a highly simplified manner. These can have a sleeve-like region 49 which is placed around the reaction tubes 20 or the tube sections in the region 11.

Figure 4:
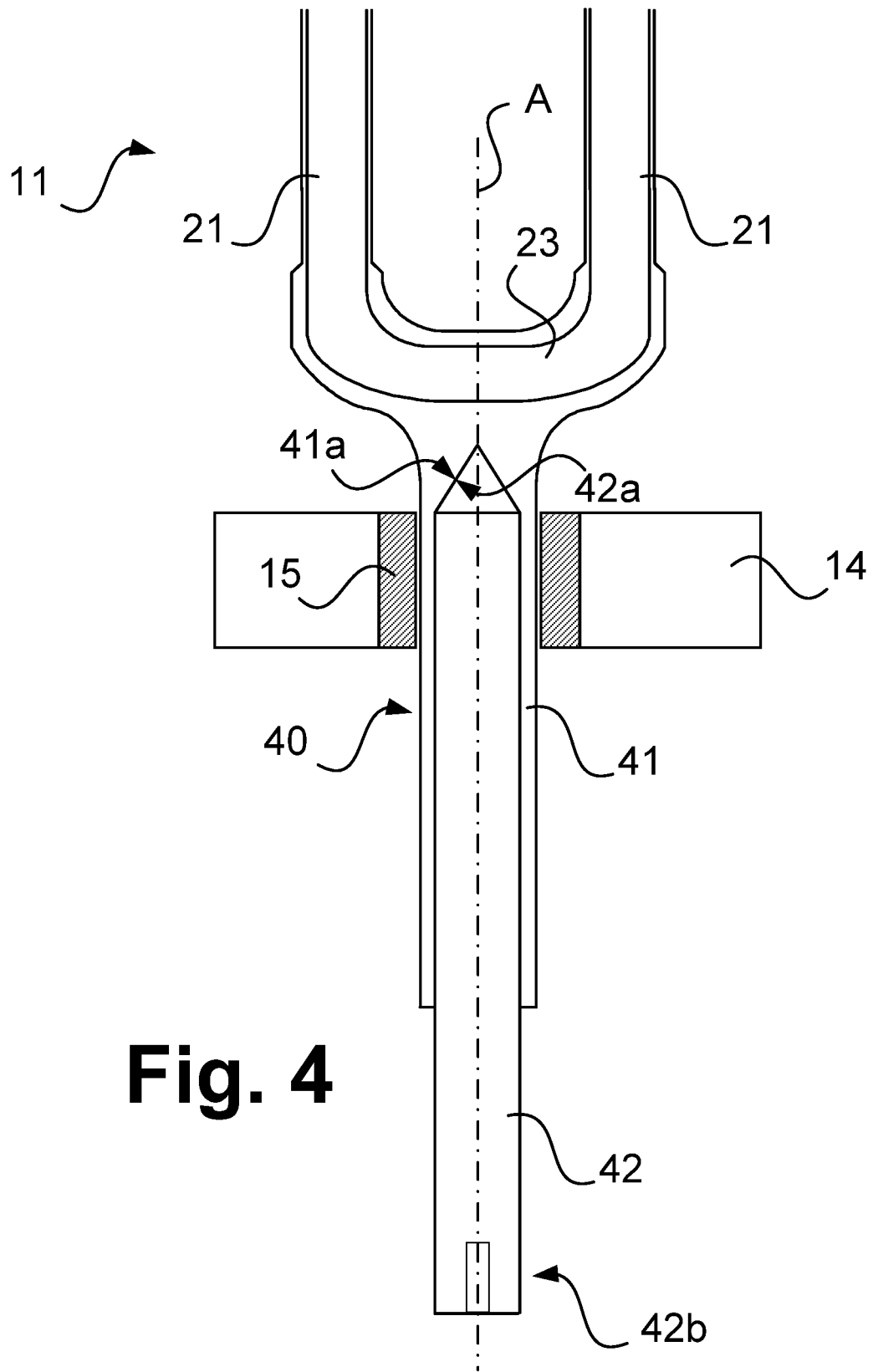
FIG. 4 schematically illustrates a reactor with a current feed arrangement according to an embodiment of the invention.

FIG. 4 shows a sectional view of the area 11 of a reactor 100, for example as shown in FIG. 2, with a current feed arrangement 40 arranged in the area 11 and a reaction tube 20 connected thereto, whose tube sections 21, illustrated here in sections, merge into one another here via a reverse bend 23.

The reverse bend 23 is formed here with a reinforced wall which adjoins the two tube sections 21 in the area 11. One wall of the reverse bend 23 is connected to or integrally formed with a first section 41 of a current feed arrangement 40 already schematically illustrated before.

The current feed arrangements 40 each have the first section 41 and a second section 42, the first section 41 extending here along a longitudinal axis A starting from the two tube sections 21 or the reverse bend 23. The first section 41 surrounds the second section 42 in a sleeve-like manner in each case in a region of the current feed arrangements 40, and the first section 41 and the second section 42 have contact surfaces 41a, 42a arranged obliquely to the longitudinal axis A for contacting with one another.

The tapered contact surfaces 41a, 42a of the first section 41 and the second section 42 of the current feed arrangements 40 are each formed as tapered inner and outer surfaces which can be brought into contact with each other by pushing the first section 41 and the second section 42 of the current feed arrangements 40 in or together. More precisely, in the example shown, the conical contact surfaces 41a, 42a are formed as inner and outer surfaces of a conical shell with a cone angle of 60°.

The current feed arrangements 40 each extend at a wall passage 15 through a wall 14 of the reactor vessel 10 and are accommodated here so as to be longitudinally movable. The wall passage 15 is shown here as being exaggeratedly wide and is lined, for example, with an insulating material shown as hatched.

Optionally, but in no way essential to the invention, an unillustrated bellows arrangement may be provided on the outside of the wall 14 of the reactor vessel 10 to ensure a gas-tight seal of the reactor vessel 10 from the environment despite the longitudinal mobility of the rod-shaped current feed arrangements 40.

Bus bars or stranded wires may be attached to one end 42b of the second section 42 for connecting the previously illustrated phases U,V,W or corresponding current connections of a direct current source or a single-phase alternating current source.

Figure 5:
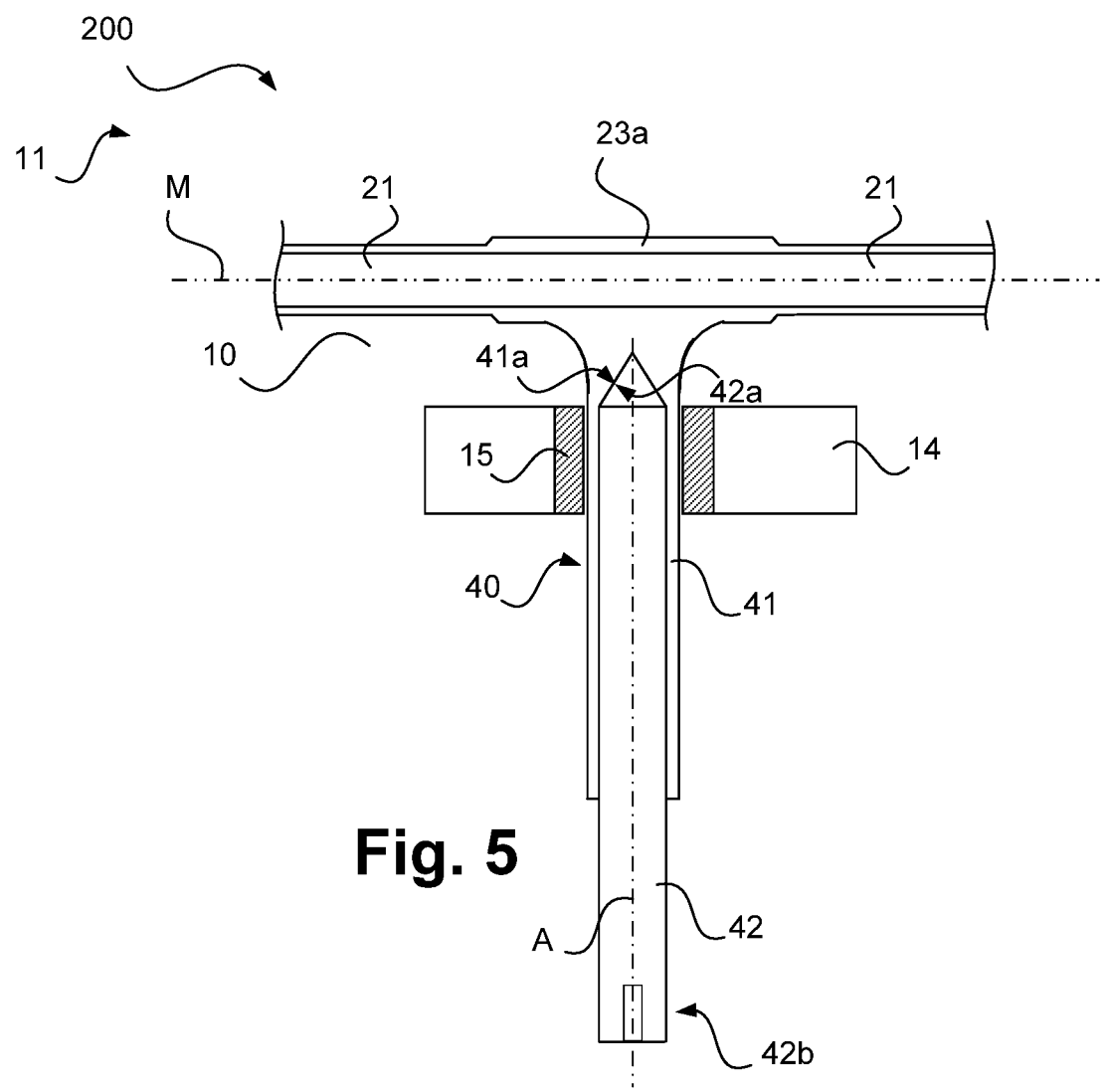
FIG. 5 illustrates a current feed region of a reactor according to an embodiment of the invention.

FIG. 5 shows a sectional view of the current feed region 11 of a reactor 200, wherein the elements shown in each case have already been explained in connection with FIG. 4. In contrast to FIG. 4, however, the reaction tube 20 here does not have a reverse bend and the tube sections 21 are arranged along a common central axis M. An uncurved transition region is marked 23a. A corresponding design can be used, for example, instead of a sleeve in the reactor 200 according to FIG. 3. The transition region 23a is also formed here with a reinforced wall, to which the first section 41 of the current feed arrangement 11 is connected. For further explanations, reference is made to FIG. 4.

Figures 6A, 6B:
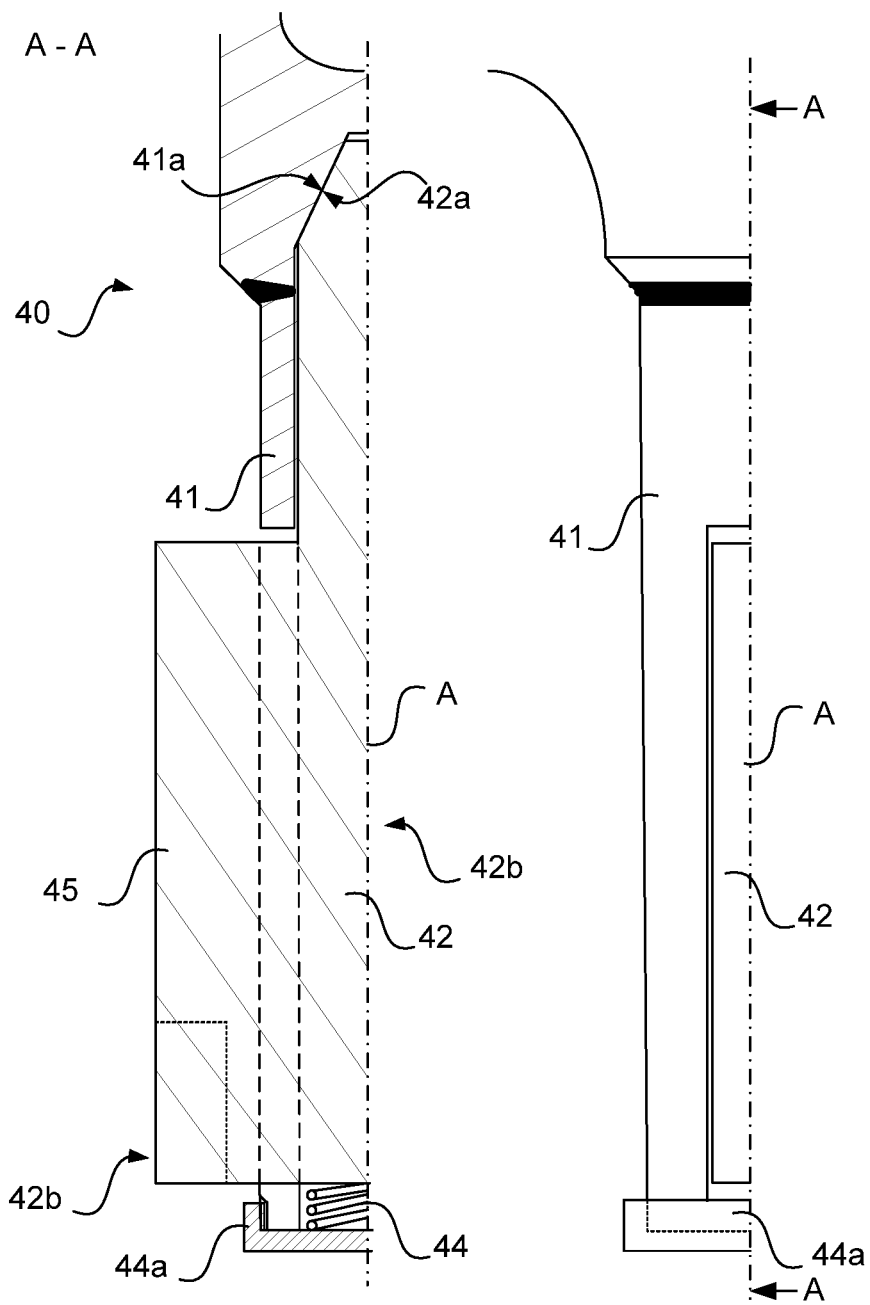
FIGS. 6A and 6B illustrate reaction tubes and corresponding arrangements for use in a reactor according to an embodiment of the invention.

FIGS. 6A and 6B show a longitudinal section through a current feed arrangement 40 according to an embodiment of the invention along two sectional surfaces perpendicular to each other.

As shown in FIG. 6A, an elastically deformable biasing element 44 in the form of a spring is provided, which presses the second section 42 of the current feed arrangements 40 along the longitudinal axis A in the direction of the first section 41 and is supported in a shell 44a. Furthermore, the second section 42 of the current feed arrangements 40 is provided with surface enlarging elements 45 in form of cooling fins.

In cracker furnaces, in addition to the reaction tubes 20 shown previously in FIGS. 1 and 2, which are usually referred to as 6-passage coils and which have six straight sections of tube 21 with, in total, five 180° bends, variants with fewer passages can also be used.

For example, so-called 2-pass coils have only two straight tube sections 21 and only one 180° elbow or reverse bend 23. This is illustrated in FIGS. 7A to 7C. The current injection may take place at one point per reaction tube 21 at the lower (or only) reverse bend. In each case M reaction tubes can be electrically coupled to one another, with a phase shift of 360°/M and with a common connecting element 30. In this case, in a first alternative, a particularly large connecting element 30 can be used for each coil package or for all the reaction tubes 20 considered in each case. In a second alternative, however, it is also possible to use two smaller connecting elements 30.

The first alternative just explained is illustrated in FIG. 7B and the second alternative just explained in FIG. 7C in a cross-sectional view through the tube sections 21, wherein a corresponding reaction tube 20 is shown in a view perpendicular to the views of FIGS. 7B and 7C in FIG. 7A. Reference is made to FIG. 1 for the designation of the corresponding elements. It is understood that the connecting element or elements 30 with the reverse bends 23 possibly arranged there on the one hand and the other reverse bends 23 on the other hand with the connections to the phases U, V, W via the current feed arrangements 40 (shown here in a highly simplified manner) are arranged in different planes, corresponding to the first and the area 11, 12 of a reactor. Again, it should be emphasised that the presence and arrangement of the connecting elements 30 is purely optional or arbitrary in the context of the invention.

Accordingly, this concept can also be applied to coils or reaction tubes 20 with four passages or tube sections 21 (so-called 4-passage coils), in this case with one, two or four star bridges or connecting elements 30. A corresponding example is shown in FIGS. 8A and 8B, wherein four connecting elements 30 are shown in FIG. 8B. For better illustration, the reverse bends 23 are shown here dashed (reverse bends in the area 12) and unshaded (reverse bends in the area 11). For the sake of clarity, the elements are only partially marked with reference signs.

FIGS. 9A to 9C show further reaction tubes for use in a reactor according to an embodiment of the invention. The reaction tubes and tube sections are only partially indicated here with reference signs. Feed and withdrawal sections are indicated by the flow arrows shown. The current feed arrangements 40, which may be present several times and may be designed in the manner explained above, are indicated in a highly simplified dashed line.

The invention claimed is:

1. A reactor for carrying out a chemical reaction, comprising:
   a reactor vessel; and
   one or more reaction tubes, a number of tube sections of the one or more reaction tubes running inside the reactor vessel, and the tube sections each being electrically connected or connectable to one or more current connections in a current feed region for electrically heating the tube sections;
   wherein:
      current feed arrangements are arranged in the current feed region, to which in each case one of the tube sections or in each case one group of the tube sections is electrically connected;
      the current feed arrangements in each case have a first section and a second section, wherein:
         the first section extends from the respective tube section or the respective group of tube sections or an element connected thereto along a longitudinal axis,
         the first section at least partially surrounds the second section or the second section at least partially surrounds the first section in a sleeve-like manner in a region of the current feed arrangements in each case, and
         the first section and the second section have contact surfaces arranged obliquely to the longitudinal axis for contacting one another; and
      the current feed arrangements each extend through a wall of the reactor vessel at a wall passage.

2. The reactor according to claim 1, wherein a material connection is provided between the first sections of the current feed arrangements and the respective tube sections or the respective groups of tube sections, or wherein the first sections of the current feed arrangements and the respective tube sections or the respective groups of tube sections are integrally formed.

3. The reactor according to claim 1, wherein the contact surfaces of the first section and the second section of the current feed arrangements are formed as tapered inner and outer surfaces that can be brought into contact with each other by pushing the first section and the second section of the current feed arrangements in or together.

4. The reactor according to claim 1, wherein the contact surfaces are formed as inner and outer surfaces of a conical shell or as inner and outer surfaces of the conical shell of a truncated cone.

5. The reactor according to claim 4, wherein the conical contact surfaces include a cone angle of 40 to 120°.

6. The reactor according to claim 4, wherein an elastically deformable biasing member is provided which urges the second section of the current feed arrangements along the longitudinal axis towards the first section.

7. The reactor according to claims 1, wherein the contact surfaces are formed as surfaces of threads.

8. The reactor according to claim 1, wherein the second section of the current feed arrangements is provided with and/or connected to surface enlarging elements.

9. The reactor according claim 1, wherein the current feed arrangements are each longitudinally movable in their respective wall passages through the wall of the reactor vessel.

10. The reactor according to claim 1, wherein the current feed arrangements outside the reactor vessel are electrically connected or connectable to the power terminals of a power source by means of flexible connection elements.

11. The reactor according to claim 1, wherein the reaction tube or tubes comprise one or more reverse bends in the reactor vessel.

12. The reactor according to claim 1, wherein the reaction tube or tubes extending within the reactor vessel without reverse bends.

13. The reactor according to claim 11, which is designed as a reactor for steam cracking.

14. The reactor according to claim 1, wherein the second section is formed at least in part of a material selected from the group consisting of molybdenum, tungsten, tantalum, niobium, and chromium, or is formed of an alloy comprising, by mass, at least 50% of a metal selected from the group consisting of molybdenum, tungsten, tantalum, niobium, nickel and chromium.

15. The reactor according to claim 12, which is designed as a reactor for steam reforming, for dry reforming, or for catalytic dehydrogenation of alkanes.

16. The reactor according to claim 2, wherein the contact surfaces of the first section and the second section of the current feed arrangements are formed as tapered inner and outer surfaces that can be brought into contact with each other by pushing the first section and the second section of the current feed arrangements in or together.

17. The reactor according to claim 4, wherein an elastically deformable biasing member is provided which urges the second section of the current feed arrangements along the longitudinal axis towards the first section.

18. The reactor according to claim 2, wherein the contact surfaces are formed as surfaces of threads.

19. The reactor according to claim 3, wherein the contact surfaces are formed as surfaces of threads.

20. A method of carrying out a chemical reaction, comprising:
   using a reactor to complete the chemical reaction, the reactor comprising:
      a reactor vessel; and
      one or more reaction tubes, a number of tube sections of the one or more reaction tubes extending within the reactor vessel, the tube sections each being electrically connected to one or more current connections in a current feed region for electrically heating the tube sections;
   wherein:
      current feed arrangements are arranged in the current feed region, to which in each case one of the tube sections or in each case one group of the tube sections is electrically connected;
      the current feed arrangements each have a first section and a second section, wherein:
         the first section extends from the respective tube section or the respective group of tube sections or an element connected thereto along a longitudinal axis,
         the first section at least partially surrounds the second section or the second section surrounds the first section in a sleeve-like manner in a region of the current feed arrangements in each case, and the first section and the second section have contact surfaces arranged obliquely to the longitudinal axis for contacting one another, and
the current feed arrangements each run through a wall of the reactor vessel at a wall passage.

* * * * *